April 26, 1960  H. B. MORTENSON ET AL  2,934,374
AUXILIARY STORAGE COMPARTMENT FOR VEHICLES
Filed April 25, 1958  2 Sheets-Sheet 1
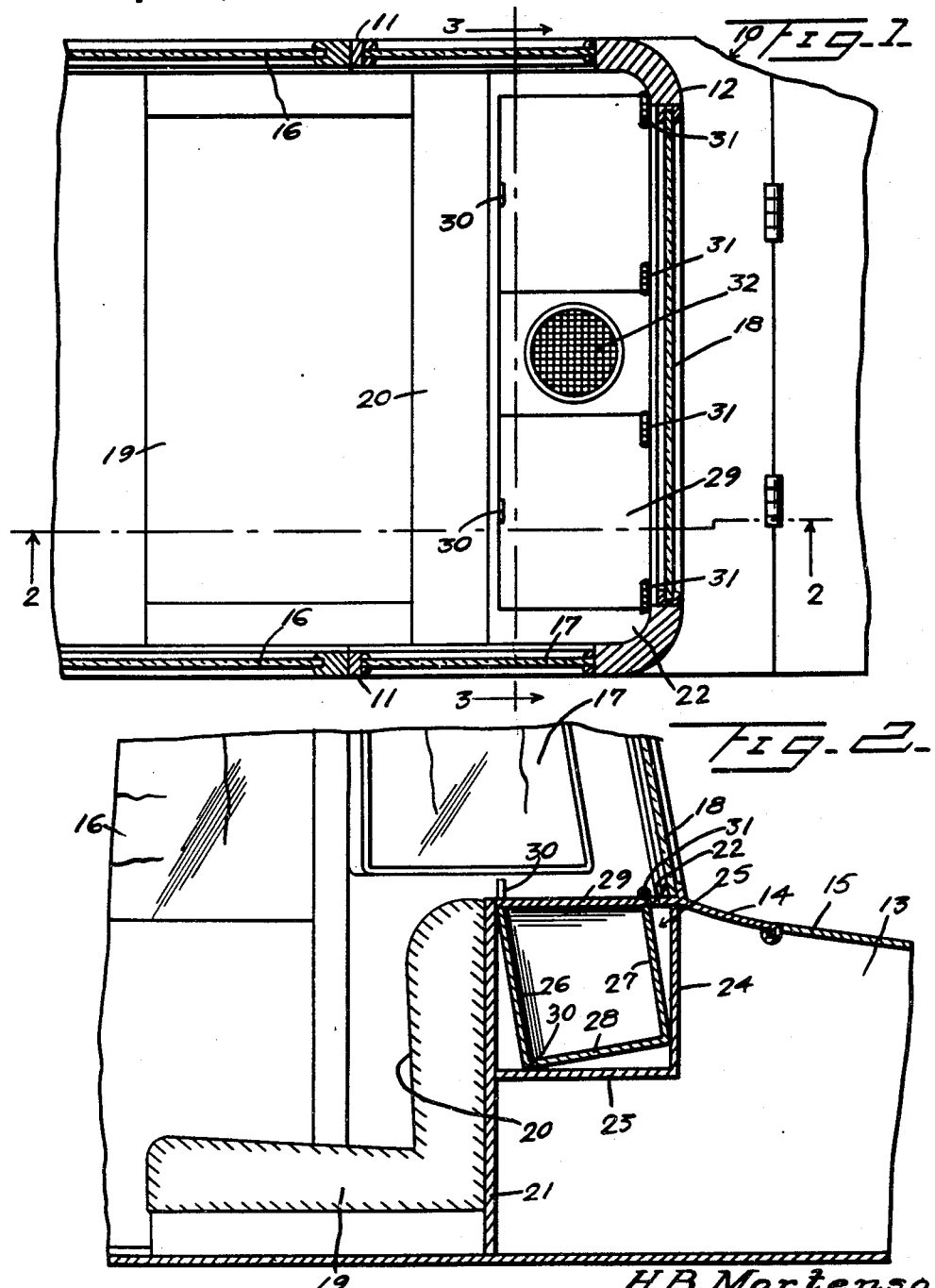
H.B. Mortenson
Nina E. Mortenson
INVENTORS
BY *C.A. Snow & Co.*
ATTORNEYS.

April 26, 1960 H. B. MORTENSON ET AL 2,934,374
AUXILIARY STORAGE COMPARTMENT FOR VEHICLES
Filed April 25, 1958 2 Sheets-Sheet 2
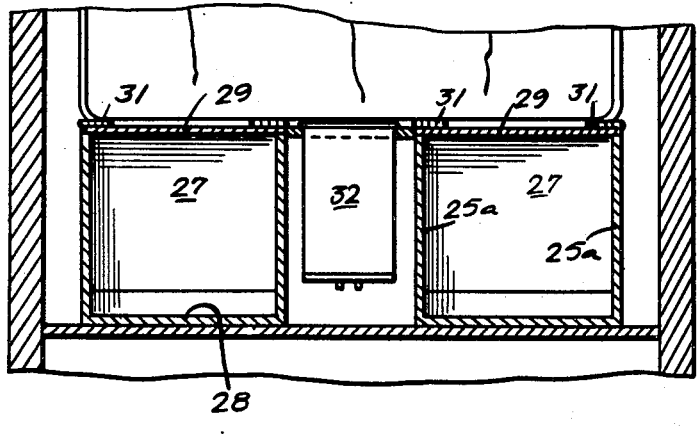
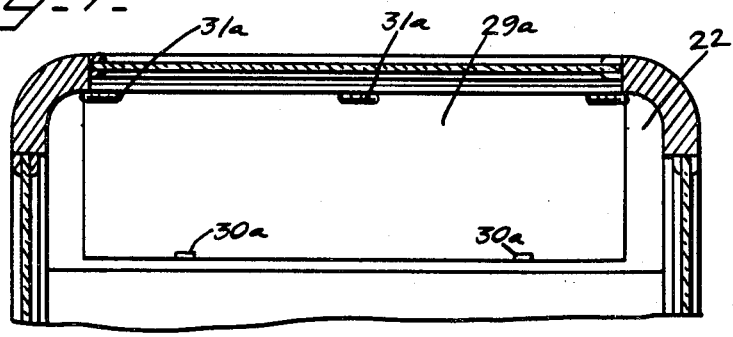
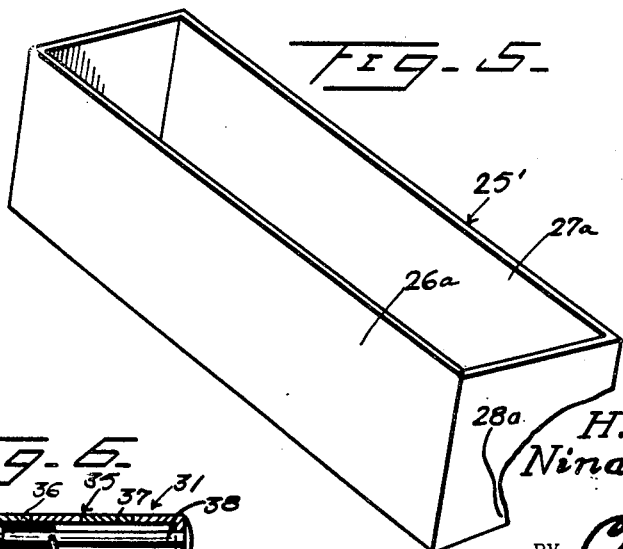
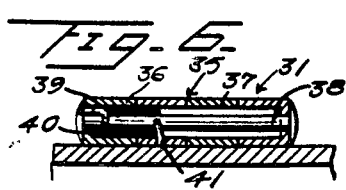
H.B. Mortenson
Nina E. Mortenson
INVENTORS
BY CA Snow &Co.
ATTORNEYS.

2,934,374
AUXILIARY STORAGE COMPARTMENT FOR VEHICLES

Hans B. Mortenson and Nina E. Mortenson, Sacramento, Calif.

Application April 25, 1958, Serial No. 730,984

1 Claim. (Cl. 296—37)

This invention relates to an auxiliary storage compartment for vehicles, and has as its primary object the provision of a compartment or compartments for the storage of small objects, to which access may be had from the interior of the vehicle, and which occupies space normally wasted.

An additional object of the invention is the provision of such a compartment which occupies the space which normally exists between the back of the rear seat of a vehicle, and the rear window thereof.

An additional object of the invention is the provision of such a device which extends only a comparatively slight distance into the luggage compartment of the vehicle, and then only into space not normally occupied at the top of the luggage compartment.

A further object of the invention is the provision of such a compartment or compartments provided with a spring lid, which is normally retained in closed position at all times.

A further and more specific object of the invention is the provision of such a compartment which has a forwardly sloping bottom surface, in order that its contents may be more readily accessible in the interior of the vehicle.

Another object of this invention is to provide a vehicle with one or more removable storage compartments in the space back of its rear seat.

Still other objects reside in the combinations of elements, arrangements of parts, and features of construction, all as will be more fully pointed out hereinafter and shown in the accompanying drawings.

In the drawings:

Figure 1 is a top plan view of the receptacle with its cover in closed position, showing its location within the body of a motor vehicle, portions of the latter being in section.

Figure 2 is a sectional view taken substantially along the line 2—2 of Figure 1 as viewed in the direction indicated by the arrows.

Figure 3 is a sectional view taken substantially along the line 3—3 of Figure 1 as viewed in the direction indicated by the arrows.

Figure 4 is a view similar to Figure 1, but showing a modified form of construction.

Figure 5 is a view of the receptacle as shown in Figure 4, removed from its association with the vehicle.

Figure 6 is an enlarged sectional view through one of the hinges for the cover or lid showing construction thereof.

Similar reference characters refer to similar parts throughout the several views of the drawings.

Having reference now to the drawings in detail, there is generally indicated at 10 a motor vehicle body, including the customary side walls 11 and rear wall 12, as well as a luggage compartment 13, including a deck 14 and a hinged closure 15. The side walls include the customary rear doors 16, and rear windows 17, while the rear wall is provided with a rear window 18. A conventional seat 19 is positioned in the vehicle having a back 20, which seats against the partition 21, dividing the interior of the vehicle from the luggage compartment. In normal present day vehicle construction there is a shelf 22 which extends from the partition 21 of the rear seat back to the rear 12 and its associated rear window 18. Normally this shelf serves for the retention of various miscellaneous articles, which have a tendency to impede the driver's vision out of the rear window 18, and is otherwise wasted space.

In accordance with the instant invention, there is provided a horizontal partition 23 extending substantially across the width of the luggage compartment, at a point relatively near its top, and a vertical portion 24, which provides a receptacle or storage space beneath the shelf 22.

Also in accordance with the instant invention, there is positioned within the space formed by the partitions 23 and 24 a pair of receptacles, each generally indicated at 25, and comprising suitable end walls 25a, and a forwardly inclined front wall 26 in a similarly forwardly inclined rear wall 27. The bottom wall 28 of the compartment also slants forwardly in order to provide ready accessibility to the interior thereof. A lid 29 provided with a finger grip 30 is provided for each compartment, and hinged at its rear as by means of hinges 31. In this modification of the invention two compartments are provided in order that they may be positioned on opposite sides of a conventional built-in rear seat radio speaker 32. As best shown in Figure 6 each hinge 31 includes a hinge barrel 35, comprised of alternate segments 36 and 37 secured respectively to the lid 29, and the rear wall 27. A hinge pin 38 extends through the barrel, and is spaced therefrom, and is surrounded by a coil spring 39, one end of which 40 is secured to one of the segments 36, and the other end of which 41 is secured to one of the sections 37, the arrangement thus being such that the effect of the spring is to bias the lid 29 to closed position.

Figure 5 shows a modified form of construction, wherein a receptacle 25' is provided between partitions 23 and 24, and extends substantially the full width of the shelf 22, the receptacle 21a also having front and rear inclined walls 26a and 27a respectively, and a forwardly inclined bottom portion 28a. In this modification the construction is exactly similar to that of the foregoing except that only one compartment 25a is provided, there being no rear seat radio speaker in this modification. The lid 29a has a pair of finger gripping members 30a and is hinged by means of hinges 31a substantially identical to the previously disclosed modification.

This form of construction may be applied to any vehicle, in the space beneath the shelf 22, as indicated in the foregoing modification, where there is no radio speaker or similar impediment to necessitate the use of two separate compartments.

It is obvious from examination of both Figs. 2 and 5 of the drawings, and column 2, lines 17 to and including 22, that the compartments are not only removable, but also inclined forwardly, as viewed from the left side of the vehicle. The bottoms of the removable compartments have their front edges resting on the horizontal partition, while the back edges are wedged or jammed against the lower portion of the vertical partition of the vehicle.

The advantages of having the compartments removable are many. For example, it makes it more accesible for repairs to that part of the body structure of the vehicle that is under the compartments. Then, too, it is sometimes easier to remove compartments to fill or unload them, due to the nature of the contents. The fact that the compartments are inclined in a forward direction, with the bottoms sloping downwardly towards the front makes the compartments more accessible for the removing of any small objects that may be placed in the same, as they will naturally have a tendency to roll or slide towards the front portion noted by the reference character 30 in Fig. 2 of the drawings. This feature of the construction of the invention is obviously a desirable one, as it enables one to more readily both see and remove small objects from the stated compartments.

From the foregoing it will now be seen that there is herein provided an improved receptacle which is adapted to utilize otherwise wasted space in a vehicle, which provides additional storage space for small objects, and which substantially removes the necessity of piling the objects on the shelf in front of the rear window of the vehicle, and thus improving the driver's view out of the rear window, and which accomplishes all of the objects of this invention, and others, including many advantages of great practical utility and commercial importance.

As many embodiments may be made of this inventive concept, and as many modifications may be made in the embodiments herein before shown and described, it is to be understood that all matter herein is to be interpreted merely as illustrative and not in a limiting sense.

What we claim is:

In combination with a motor vehicle having a seat, a rear window spaced from said seat, a shelf between said seat and said rear window, a vertical partition extending downwardly from the bottom of said rear window, a horizontal partition extending rearwardly from the back of said seat, said horizontal partition in horizontal spaced relation to said shelf, the rearmost edge of said horizontal partition secured to the lowermost edge of said vertical partition, thereby forming a compartment in back of said seat, one or more compartments each having front and back walls secured in spaced relation to end walls, and a bottom, said compartments being removably placed within said first-mentioned compartment, said front wall of said second-mentioned compartments being inclined rearwardly and downwardly from the back of the top edge of said back seat as viewed from the lefthand side of said vehicle, the bottoms of said second-mentioned compartments inclining upwardly and rearwardly from the bottom edge of said front wall of said second-mentioned compartments as viewed from the lefthand side of said vehicle, said front edge of said bottom of said second-mentioned compartments resting on said horizontal partition of said first-mentioned compartment, said back walls of said second-mentioned compartments being inclined downwardly and rearwardly as viewed from the left side of said vehicle, the rear and lower edges of said second-mentioned compartments being wedged against the said vertical partition of said vehicle, a lid having finger grips hingedly secured by means of barrel-type hinges to the top of each of said second-mentioned compartments, and a spring within each of said hinges for normally holding said lid in a closed position.

References Cited in the file of this patent

UNITED STATES PATENTS

| | | |
|---|---|---|
| 554,008 | Sessions | Feb. 4, 1896 |
| 1,204,523 | Watts et al. | Nov. 14, 1916 |
| 1,473,161 | Rogers | Nov. 6, 1923 |
| 1,715,308 | Richardson | May 28, 1929 |
| 2,044,334 | Shrewsbury | June 16, 1936 |
| 2,653,741 | Senk | Sept. 29, 1953 |
| 2,846,261 | Nickles | Aug. 8, 1958 |

OTHER REFERENCES

1956 De Soto Brochure, "Optional Equipment for Your Modern Driving Pleasure," page 6, rear seat speaker.